S. R. BERGMAN.
DYNAMO ELECTRIC MACHINE.
APPLICATION FILED OCT. 13, 1915.
1,257,177.
Patented Feb. 19, 1918.
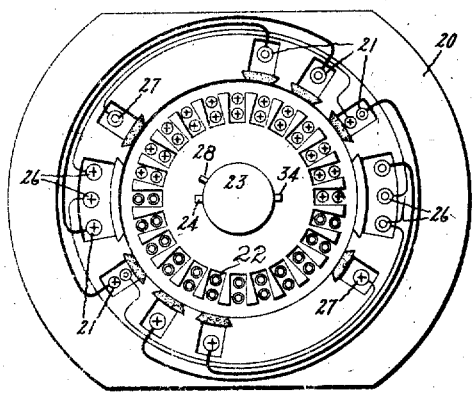
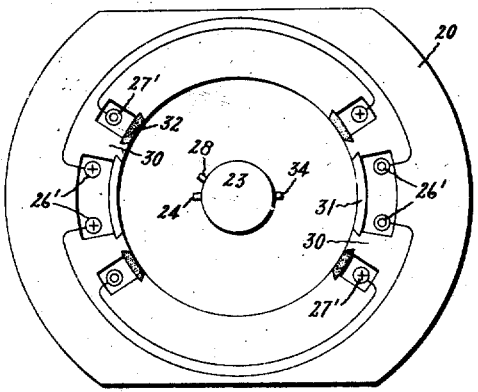
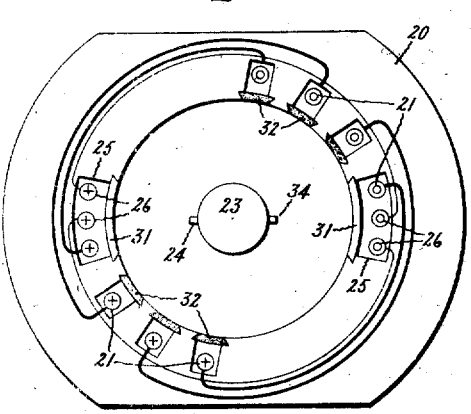
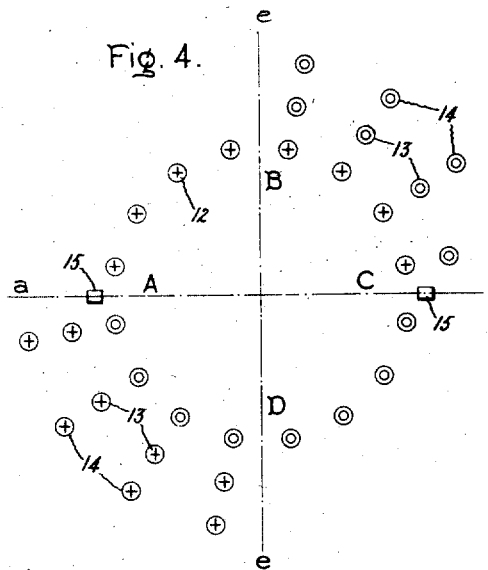
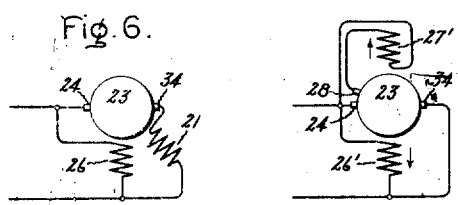
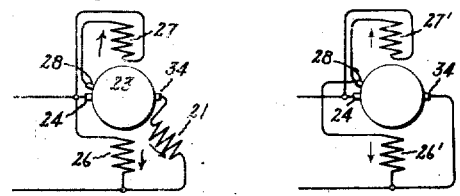
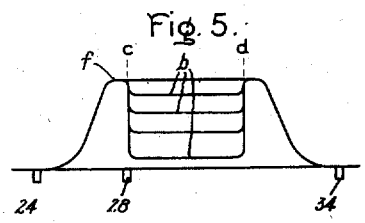
Inventor:
Sven R. Bergman,
by Albert H. Davis
His Attorney.

UNITED STATES PATENT OFFICE.

SVEN R. BERGMAN, OF NAHANT, MASSACHUSETTS, ASSIGNOR TO GENERAL ELECTRIC COMPANY, A CORPORATION OF NEW YORK.

DYNAMO-ELECTRIC MACHINE.

1,257,177.   Specification of Letters Patent.   Patented Feb. 19, 1918.

Application filed October 13, 1915.   Serial No. 55,632.

*To all whom it may concern:*

Be it known that I, SVEN R. BERGMAN, a subject of the King of Sweden, residing at Nahant, in the county of Essex, State of Massachusetts, have invented certain new and useful Improvements in Dynamo-Electric Machines, of which the following is a specification.

My invention relates to dynamo-electric machines and particularly to direct current dynamo-electric machines. The object of my invention is to provide a novel and improved direct current dynamo-electric machine.

In its complete form my invention relates especially to direct current dynamo-electric machines adapted for operation as motors and as generators of practically constant direct current electromotive force when operating at variable speed. Such machines are extensively used in electric starting and lighting outfits on motor vehicles. In such outfits the dynamo-electric machine is associated with an internal combustion engine and a storage battery, and operates as a motor supplied with electric energy from the battery for starting the engine and as a generator for charging the battery. The number of cells in the storage battery on a motor vehicle is limited on account of cost, weight, and space required. The number of cells should be as low as possible in order to minimize the initial cost, weight and space required; and it is usually found desirable to have not more than six cells, corresponding to approximately twelve volts. It is a difficult problem to provide an acceptable dynamo-electric machine operating from such a low voltage which will develop a sufficient torque to start the engine and bring it up to the desired speed. This difficulty is increased where the same dynamo-electric machine is used as a generator for charging the battery, particularly as the charging operation should be started at the lowest possible generator speed. It will be evident from the foregoing discussion that a dynamo-electric machine for an electric starting and lighting outfit should have when operating as a motor as large a torque as possible per pound of machine weight. That is to say, the quotient obtained by dividing the torque of the machine expressed in foot pounds by the weight of the machine should be as high as possible. My present invention aims to provide a dynamo-electric machine adapted to be used in electric starting and lighting outfits, whose torque per pound of machine weight is relatively high, as compared with any other machine adapted for this use with which I am acquainted. While my invention in its complete form particularly relates to dynamo-electric machines for electric starting and lighting outfits, certain features of the invention are generally applicable to machines for other purposes. Thus, certain features of my present invention may be advantageously utilized in the provision of a novel and improved dynamo-electric machine having compound excitation, while other features may be employed to provide a novel and improved direct current generator of approximately constant voltage over a relatively wide range speed. These and other objects of my invention will be brought out in the course of the following description.

The novel features which I believe to be patentably characteristic of my invention are definitely pointed out in the claims appended hereto. The principle of my invention and its application to direct current dynamo-electric machines will be understood from the following description taken in connection with the accompanying drawings, in which;

Figures 1, 2 and 3 are diagrammatic views illustrating machines embodying the novel features of my present invention; Fig. 4 is an explanatory diagrammatic view; and Figs. 5, 6, 7, 8, and 9 are explanatory diagrams.

Fig. 1 of the drawings diagrammatically represents a dynamo-electric machine embodying my present invention in its complete form. This machine is particularly adapted to operate on the one hand as a motor for starting an internal combustion engine and on the other hand as a generator of practically constant voltage over a relatively wide range of the machine's normal operating speeds. When operating as a generator the machine has in general the characteristics of the machine represented in Fig. 2 of the drawings, while when operating as a motor the machine has the characteristics, and particularly the starting characteristics, of a compensated series motor of the type diagrammatically represented in Fig. 4 of the drawings. Mechanically, the machine of Fig. 1 is a combination of the machines of Figs. 2 and 4, and in the following exposition of my invention I will first discuss the machines of Figs. 2, 3 and 4.

Fig. 4 diagrammatically illustrates a two-pole dynamo-electric machine having a commutated armature winding 12 and a series field winding 13, 14 distributed over one-half of the inner periphery of the field magnet member. The relative directions of current flow in the conductors of these windings are shown by means of the usual convention in which crosses and circles applied to the conductors indicate, respectively, that the current is flowing away from or toward the observer. The two halves of the conductors of the armature winding between the commutator brushes 15 carry currents flowing in opposite directions, and the armature magnetization is thus along the line $a—a$. The field winding is distributed over one-half of the inner periphery of the field magnet member, and in a bi-polar machine, such as represented in Fig. 4, is distributed around the two opposite quadrants of the armature winding and is designed to be connected in series therewith, so that it produces a magnetization at an angle of approximately 45 electrical degrees to the magnetization produced by the armature winding. For the purposes of explanation the field winding may be considered as comprising two equal component windings 13 and 14, as shown in Fig. 4. The ampere-turns of the entire field winding 13—14 are substantially equal to the armature ampere-turns, so that the ampere-turns of each component winding are substantially equal to one-half the ampere-turns of the armature winding, and the axis of magnetization of each component winding is displaced in space by substatially 45 electrical degrees from the axis of magnetization of the armature winding. The component winding 14 combines with the two quadrants of the armature winding over the arcs A—B and C—D to form a uniformly distributed exciting winding having an axis of magnetization along the line $e—e$. That is to say, the winding 14 plus one-half of the armature winding constitutes in effect an exciting winding distributed all around the periphery of the rotor of the machine. The other half of the armature winding over the arcs B—C and D—A is adjacent the component winding 13, and since the radially adjacent conductors of these two windings carry currents flowing in opposite directions, the armature reaction due to this half of the armature winding is neutralized. Since the field winding 13, 14 is connected in series with the armature winding and the strength of its magnetization is substantially equal to that of the armature winding, the armature reaction is in effect just neutralized at all loads, and the machine has the characteristics of a compensated series machine.

Fig. 3 of the drawings diagrammatically represents a bipolar machine of the type shown in Fig. 4 having in addition a shunt exciting winding adapted to produce a magnetization substantially at 90 electrical degrees to the axis of magnetization of the armature winding. The field magnet structure or member 20 of the machine of Fig. 3 preferably has an oblong configuration for the purposes explained in my Letters Patent of the United States No. 1,173,089, patented Feb. 22, 1916. The inner periphery of the field magnet member 20 is slotted in two opposite quadrants, while the other two quadrants have a continuous peripheral surface. A winding 21 designed to be connected in series with the armature winding is disposed in the slots of the field magnet member and produces a magnetization at an angle of substationally 45 electrical degrees to the axis of magnetization of the armature winding. The armature winding is connected in the usual manner to the segments of a commutator 23, upon which bear the brushes 24 and 34. The field winding 21 corresponds in every respect to the field winding 13, 14 of the machine shown in Fig. 4, and as explained in the description of the latter figure, the magnetization produced by the field winding 21 may be considered as composed of two equal components, one of which coincides with and substantially neutralizes one-half of the armature reaction, while the other component combines with the other half of the armature reaction to form in effect a resultant flux at right angles, electrically, to the armature reaction, thereby producing the exciting field of the machine. The winding 21 is connected in series with the armature winding so as to neutralize the armature reaction at all loads.

The inner periphery of the field magnet member 20 is provided with wide slots or open spaces 25 in the zone of commutation. The provision of such wide slots increases the magnetic reluctance of the air gap in the commutating zone and decreases the magnetic flux influencing the short-circuited armature conductors undergoing commutation, so that at most only a very weak magnetic field exists in the commutating zone, whereby a substantially neutral commutating zone is provided. The width of the slots 25 is such that the short-circuited armature coils undergoing commutation are located in this neutral commutating zone during the entire interval that they are short-circuited so that the electromotive force induced in such coils by their movement in this weak magnetic field is substantially negligible. The wide slots 25 are preferably closed with non-magnetic wedges 31, while the other slots in the field magnet member are closed with magnetic wedges 32. The use of non-magnetic wedges in the commutating zone insures a clean neutral commutating zone. In accordance with one feature of my present invention, the wide slots 25 are used for the accommodation of a shunt field winding 26. Thus in Fig. 3 of the drawings, each slot 25 is represented as occupied by one coil of the distributed field winding 21 and two coils of the concentrated shunt winding 26. The shunt winding 26 is arranged to produce an exciting magnetization at an angle of substantially 90 electrical degrees to the axis of magnetization of the armature winding, and by its use a compound excitation of the machine may be obtained. Fig. 6 of the drawings diagrammatically represents the electrical connections and magnetic relations of the three windings of the machine illustrated in Fig. 3.

The machine diagrammatically represented in Fig. 2 of the drawings has a field winding consisting of two opposing shunt windings. The shunt winding 26' corresponds in every respect to the shunt winding 26 of the machine of Fig. 3. The winding 27' is a bucking winding and its magnetization, while in line with that of the winding 26' is in opposition thereto. It will be evident that the excitation of the machine is thus the resultant of the magnetizations produced by the two windings 26' and 27'. The machine is provided with an auxiliary pilot brush 28 bearing on the commutator 23. The position of the pilot brush 28 is determined by the pitch of the coils of the bucking winding 27', as will be more fully explained hereinafter. The electrical connections of the windings of the machine of Fig. 2 are diagrammatically represented in Fig. 7. The arrows indicate the relative directions of the currents flowing in the field windings 26' and 27', and hence the relative directions of their magnetizations. The bucking winding 27' is shown in Fig. 7 as connected between the pilot brush 28 and the nearer main brush 24.

The resultant magnetic flux produced by the two field windings 26' and 27' is diagrammatically represented in Fig. 5. The flat-topped wave $f$ represents the flux produced by the main shunt winding 26', while the horizontal lines $b$ represent the depressions made in this flux wave by the bucking flux produced by the winding 27' at different speeds of the machine. The bucking winding 27' blows out the flux produced by the winding 26' over that portion of the polar arc between the points $c$ and $d$. The pilot brush 28 is so positioned that the armature coils between it and the main brush 24 are not within the influence of that portion of the main shunt flux blown out by the bucking flux. Thus the pilot brush is shown in Fig. 5 as directly beneath the point $c$. It will thus be seen that the bucking flux has no effect on the flux which is cut by the armature conductors between the pilot brush 28 and the main brush 24, between which two brushes the bucking winding 27' is connected. If we assume that the shunt winding 26' is excited from a source of direct current energy of substantially constant potential then its flux wave remains substantially the same for all speeds of the machine. The voltage which is induced in the armature conductors between the pilot brush 28 and the main brush 24 results from the movement of these armature conductors in that portion of the flux of the main shunt winding 26' which is not affected by the bucking winding and since this is a constant flux the voltage induced in these armature conductors varies directly with the speed of the machine. Therefore, as the speed of the machine increases, the magnitude of the voltage impressed on the bucking winding 27' increases, and hence the bucking flux increases and the depression in the flux wave $f$ becomes deeper. It will thus be evident to those skilled in the art that the main shunt and bucking windings may be so proportioned and designed that when the machine is operating as a generator the resultant exciting field decreases in strength as the speed of the machine increases, so that the voltage at the machine's terminals is for many practical purposes fairly constant over a relatively wide range of speed.

I have found that the best results are obtained with a machine of the type represented in Fig. 2, when the portion of the inner periphery of the field magnet member embraced or spanned by the bucking coils 27' is operated at a low flux density, while the portions 30 of the field magnet structure are operated at a high flux density. In fact, I have found that the best results are obtained when the portions 30 are magnetically highly saturated. If the machine is proportioned so as to obtain a magnetic saturation in the different parts, as just described, it will, when operating as a generator, produce approximately constant potential independent of the speed.

The decrease in the resultant exciting field of the machine of Fig. 2 can be made more pronounced for corresponding increases in speed by connecting the main shunt winding 26' between the pilot brush 28 and the farther main brush 34, as represented in Fig. 9. Since the voltage between the brushes 24 and 28 increases with the speed of the machine, the voltage between the brushes 28 and 34 must decrease with the speed, provided, of course, the voltage at the terminals of the machine remains substantially constant at all speeds. Where the winding 26' is thus connected across the brushes 28 and 34, the excitation produced by it decreases as the speed of the machine increases, and the resultant exciting field is accordingly decreased. The main exciting winding 26' is with either connection a shunt winding, since it is connected in shunt to a whole or a part, as the case may be, of the armature winding, and it will of course be understood that where I hereinafter speak of the main exciting winding as connected in shunt relation to the armature winding I mean to cover both connections hereinbefore described.

It will be evident from the foregoing explanation that the auxiliary brush 28 is so positioned on the commutator that the armature coils between it and one of the main brushes are positioned in an approximately constant magnetic field over a relatively wide range of the machine's normal operating speeds. The essential characteristic of the auxiliary brush is that the voltage between it and one of the main brushes shall vary as a direct function of the speed of the machine, and preferably directly as the speed, and while I have shown one arrangement by which this can be accomplished, other arrangements will suggest themselves to those skilled in the art. The bucking winding is thus energized by a voltage preferably derived from the armature and varying as a direct function of the speed of the machine and preferably varying directly as the speed.

The machine represented in Fig. 1 may be considered as the constant potential generator represented in Fig. 2 with the addition of a distributed field winding 21 arranged to produce a magnetization at an angle of approximately 45 electrical degrees to the axis of the armature magnetization, being thus in effect a mechanical combination of the machines represented in Figs. 2 and 4. The machine of Fig. 1 may also be considered as the machine of Fig. 3 provided with a bucking winding 27 arranged and connected just as the bucking winding 27' of the machine of Fig. 2. The machine of Fig. 1 thus has a distributed field winding 21 connected in series relation with the armature winding 22 and arranged to produce a magnetization at an angle of approximately 45 electrical degrees to the axis of magnetization of the armature winding, an exciting winding 26 connected in shunt relation with the armature winding and arranged to produce a magnetization at an angle of approximately 90 electrical degrees to the axis of magnetization of the armature winding and a bucking winding 27 arranged to produce a magnetization in line with but opposed to the magnetization produced by the exciting winding 26. The electrical connections of the four windings of the machine of Fig. 1 are shown in the diagram of Fig. 8, and the magnetic relations of the windings are represented by their space positions. It will, of course, be understood that the shunt winding 26 may be connected between the brushes 28 and 34, just as explained in connection with the machine of Fig. 2. Such a connection accentuates the decrease in the strength of the exciting field of the machine as the speed increases.

The machine represented in Fig. 1 combines the desirable motor characteristics of a machine of the type represented in Fig. 4 with the constant voltage generator characteristics of a machine of the type represented in Fig. 2. When operating as a motor, the machine of Fig. 1 possesses decided series characteristics due to the effect of the series field winding 21. This insures an excellent starting torque. Furthermore, the machine is compensated so that no injurious sparking takes place during its operation as a motor when the armature current is relatively large. When the machine operates as a motor, the starting current is very many times, for example, in the neighborhood of twenty five times, the normal current when operating as a generator. Thus the effect of the series component of the resultant field excitation predominates and the shunt excitation may be neglected, so that in effect the operation of the machine as a motor is like that of a compensated series motor. When operating as a generator, however, the series component of the field excitation is relatively weak and has little effect upon the predominating shunt components. The series current is moreover substantially constant during the operation of the machine as a generator. As a generator, the machine thus has in effect a shunt excitation decreasing with the speed, so that the voltage at the terminals of the machine is for the purposes in hand practically constant.

I have shown and particularly described one embodiment of my invention for the purpose of generically explaining its principle and its application, but numerous modifications of the details of construction and arrangement of this embodiment and other applications will be apparent to those skilled in the art. I, therefore, wish to cover in the following claims all modifications within the spirit of the invention.

What I claim as new and desire to secure by Letters Patent of the United States, is:—

1. A direct current dynamo-electric machine comprising an armature winding provided with a commutator and coöperating main brushes, a field magnet structure having groups of distributed slots covering substantially one-half of its inner periphery, a series winding carried in the slots of said field magnet structure and arranged to produce a magnetization at an angle of approximately 45 electrical degrees to the magnetization produced by said armature winding, a shunt exciting winding disposed on said field magnet structure and having coils spanning the larger part of the polar arc on the inner periphery of said structure, a bucking winding having coils concentrically arranged within the coils of said exciting winding and spanning a smaller part of the polar arc on the inner periphery of said field magnet structure than the coils of said exciting winding, and an auxiliary brush located on said commutator so that the armature coils between it and a main brush are substantially outside the influence of the flux produced by said bucking winding, said bucking winding being connected between the auxiliary brush and the last mentioned main brush.

2. A direct current dynamo-electric machine comprising an armature winding provided with a commutator and coöperating main brushes, a field magnet structure having slots therein, a winding carried in the slots of the field magnet structure and arranged to produce a magnetization at an angle of approximately 45 electrical degrees to the magnetization produced by said armature winding, a shunt exciting winding disposed on said field magnet structure for producing a flux embracing the larger part of the polar arc on the inner periphery of said structure, a bucking winding disposed on said field magnet structure for producing a flux in opposition to the flux of said shunt exciting winding but embracing a smaller part of the polar arc, and an auxiliary brush located on said commutator so that the armature coils between it and a main brush are substantially outside the influence of the flux produced by said bucking winding, said bucking winding being connected between the auxiliary brush and the last mentioned main brush.

3. A direct current dynamo-electric machine comprising an armature winding provided with a commutator and coöperating brushes, a winding arranged to produce a magnetization at an angle of approximately 45 electrical degrees to the magnetization produced by said armature winding, an exciting winding arranged to produce a magnetization at an angle of approximately 90 electrical degrees to the magnetization produced by said armature winding, a bucking winding adapted to blow out a portion of the flux produced by said exciting winding over a part only of the polar arc embraced by such flux, and means for exciting said bucking winding by an electromotive force derived from armature coils located outside the influence of the flux produced by said bucking winding.

4. A direct current dynamo-electric machine having an armature winding provided with a commutator and coöperating brushes, a field magnet structure carrying a winding connected in series relation with the armature winding and arranged to produce a magnetization at an angle of approximately 45 electrical degrees to the axis of magnetization of said armature winding, a winding connected in shunt relation with the armature winding and arranged on said field magnet structure to produce a magnetization at an angle of approximately 90 electrical degrees to the axis of magnetization of said armature winding, a bucking winding arranged on said field magnet structure to produce a magnetization in line with but opposed to the magnetization produced by said last mentioned shunt winding, and means for energizing said bucking winding from a source of electromotive force derived from said commutator and varying as a direct function of the speed of the machine.

5. A direct current dynamo-electric machine comprising an armature winding provided with a commutator and coöperating main brushes, an auxiliary brush bearing on said commutator, a field magnet structure carrying a winding connected in series relation with the armature winding and arranged to produce a magnetization at an angle of approximately 45 electrical degrees to the axis of magnetization of said armature winding, an exciting winding connected in shunt relation with the armature winding and arranged on said field magnet structure to produce a magnetization at an angle of approximately 90 electrical degrees to the axis of magnetization of said armature winding, a bucking winding arranged on said field magnet structure to produce a magnetization in line with but opposed to the magnetization produced by said last mentioned shunt winding, and means for energizing said bucking winding from a source of electromotive force derived from one of said main brushes and said auxiliary brush located on said commutator so that the armature conductors between the auxiliary brush and the last mentioned main brush are positioned in an approximately constant magnetic field over a relatively wide range of the machine's normal operating speeds.

6. A direct current dynamo-electric machine comprising an armature winding provided with a commutator and coöperating main brushes, a field magnet structure having groups of distributed slots covering substantially one-half of its inner periphery, a winding carried in said slots and arranged to produce a magnetization at an angle of approximately 45 electrical degrees to the axis of magnetization of said armature winding and adapted to be connected in series with the armature winding, an exciting winding connected in shunt relation with the armature winding and arranged on said field magnet structure to produce a magnetization at an angle of approximately 90 electrical degrees to the axis of magnetization of said armature winding, a bucking winding arranged on said field magnet structure to produce a magnetization in line with but opposed to the magnetization produced by said last mentioned shunt winding, an auxiliary brush located on said commutator so that the armature coils between it and a main brush are positioned in an approximately constant magnetic field over a relatively wide range of the machine's normal operating speeds, and means for energizing said bucking winding by an electromotive force derived from said auxiliary brush and the last mentioned main brush.

7. A direct current dynamo-electric machine comprising an armature winding provided with a commutator and coöperating main brushes, a field magnet structure carrying a winding connected in series relation with the armature winding and arranged to produce a magnetization at an angle of approximately 45 electrical degrees to the axis of magnetization of said armature winding, an exciting winding connected in shunt relation to the armature winding and arranged on said field magnet structure to produce a magnetization at an angle of approximately 90 electrical degrees to the axis of magnetization of said armature winding, a bucking winding arranged on said field magnet structure to produce a magnetization in line with but opposed to the magnetization produced by said last mentioned shunt winding, an auxiliary brush bearing on said commutator, and means for energizing said bucking winding by an electromotive force varying as a direct function of the speed of the machine and derived from said auxiliary brush and one of said main brushes.

8. A direct current dynamo-electric machine comprising an armature winding provided with a commutator and a pair of coöperating main brushes, a field magnet structure carrying a main exciting winding having coils spanning the larger part of the polar arc on the inner periphery of said field magnet structure, a bucking winding having coils concentrically arranged within the coils of said main exciting winding and spanning a smaller part of the polar arc on the inner periphery of said field magnet structure than the coils of the main exciting winding, and an auxiliary brush located on said commutator so that the armature coils between it and an adjacent main brush are substantially outside the influence of the flux produced by said bucking winding, said bucking winding being connected between the auxiliary brush and said adjacent main brush.

9. A direct current dynamo electric machine comprising an armature winding provided with a commutator and coöperating brushes, a main exciting winding, a bucking winding adapted to blow out a portion of the flux produced by said main exciting winding over a part only of the polar arc spanned by said main exciting winding, and means for exciting said bucking winding by an electromotive force derived from armature coils located outside the influence of the flux produced by said bucking winding.

10. A direct current dynamo-electric machine comprising an armature winding provided with a commutator and coöperating main brushes, a shunt exciting winding arranged to span the larger part of the polar arc of the machine, a bucking winding arranged to produce a flux in opposition to the flux of said shunt winding but spanning a smaller part of the polar arc, and an auxiliary brush located on said commutator so that the armature coils between it and an adjacent main brush are substantially outside of the influence of the flux produced by said bucking winding, said bucking winding being connected between the auxiliary brush and said adjacent main brush.

11. A direct current dynamo-electric machine comprising an armature winding provided with a commutator and a pair of coöperating main brushes, a field magnet structure carrying a main exciting winding having coils spanning the larger part of the polar arc on the inner periphery of said field magnet structure, a bucking winding having coils concentrically arranged within the coils of said main exciting winding and spanning a smaller part of the polar arc on the inner periphery of said field magnet structure than the coils of the main exciting winding, the magnetic material of said field magnet structure being so proportioned that the portions of the pole face spanned by coils of both the main exciting winding and the bucking winding are operated at a low flux density while the portions of the pole face spanned by only coils of the main exciting winding are operated at a high flux density, and means for exciting said bucking winding by an electromotive force derived from armature coils located outside the influence of the flux produced by said bucking winding.

12. A direct current dynamo-electric machine comprising an armature winding provided with a commutator and coöperating main brushes, a field magnet structure carrying an exciting winding connected in shunt relation with the armature winding, a bucking winding carried on said field magnet structure and arranged to produce a flux in opposition to the flux produced by said exciting winding, an auxiliary brush located on said commutator, means including said exciting winding whereby the armature coils between said auxiliary brush and a main brush are positioned in an approximately constant magnetic field over a relatively wide range of the machine's operating speeds, and means for energizing said bucking winding by an electromotive force derived from said auxiliary brush and the last mentioned main brush.

In witness whereof, I have hereunto set my hand this 9th day of October, 1915.

SVEN R. BERGMAN.